United States Patent [19]

Myokan

[11] Patent Number: 4,795,887

[45] Date of Patent: Jan. 3, 1989

[54] THERMAL PRINTHEAD WITH COMMON ELECTRODE FORMED DIRECTLY OVER GLAZING LAYER

[75] Inventor: Isao Myokan, Hamura, Japan

[73] Assignee: Konishiroku Photo Industry Co., Ltd., Tokyo, Japan

[21] Appl. No.: 186,697

[22] Filed: Apr. 21, 1988

Related U.S. Application Data

[63] Continuation of Ser. No. 846,563, Mar. 31, 1986, abandoned.

[30] Foreign Application Priority Data

Apr. 13, 1985 [JP] Japan .................................. 60-78708
Apr. 13, 1985 [JP] Japan .................................. 60-78709

[51] Int. Cl.⁴ .......................... G01D 15/10; B41J 3/20

[52] U.S. Cl. .................................... 219/543; 219/216; 400/120; 346/76 PH

[58] Field of Search .......................... 219/216 PH, 543; 346/76 PH; 400/120

[56] References Cited

U.S. PATENT DOCUMENTS

| | | | |
|---|---|---|---|
| 4,451,835 | 5/1984 | Saito | 219/216 PH |
| 4,612,433 | 9/1986 | Nagaoka et al. | 219/216 PH |
| 4,630,073 | 12/1986 | Hashimoto | 346/76 PH |

FOREIGN PATENT DOCUMENTS

| | | | |
|---|---|---|---|
| 60-6480 | 1/1985 | Japan | 219/216 PH |
| 60-48376 | 3/1985 | Japan | 219/216 PH |

*Primary Examiner*—Andrew J. James
*Assistant Examiner*—John Lamont
*Attorney, Agent, or Firm*—Jordan B. Bierman

[57] ABSTRACT

An integrated circuit device having signal electrodes, a common electrode, an other circuit elements, a glazing layer, an extension extending over the glazing layer from the common electrode, an insulating layer formed between the extension and the signal electrodes, and a diffusion preventing layer formed close to the glazing layer between the glazing layer and another layer.

6 Claims, 5 Drawing Sheets

THERMAL PRINTHEAD WITH COMMON ELECTRODE FORMED DIRECTLY OVER GLAZING LAYER

This is a continuation of application Ser No. 846,563, filed Mar. 31, 1986, now abandoned.

BACKGROUND OF THE INVENTION

1. Field of the Invention

The present invention relates to an integrated circuit device such as a heat-sensitive recording head.

2. Description of the Prior Art

The heat-sensitive recording head (which will be shortly referred to as a "head") is constructed such that heating portions abutting directly or through an ink ribbon against a recording medium such as heat-sensitive paper or recording paper are heated selectively in a dot shape by recording electric signals so that an image can be recorded on the recording medium.

In the head thus constructed, generally speaking: a heating layer is formed on an insulating substrate; a multiplicity of opposed electrodes are formed on the heating layer to form a heating portion; this heating portion is covered with an insulating cover film to protect the opposed electrodes and the heating layer; and signal electrodes constructing those opposed electrodes are fed with, as in the later-described line type, for example, with sigaals corresponding to an objective image pattern from an integrated circuit (which will be shortly referred to as an "IC").

In the head of the later-described serial type, for example, as shown in FIG. 14 and FIG. 15 providing a section taken along line XV—XV of FIG. 14, a glazing layer 216 formed over an insulating substrate 203 is covered with a heating layer 208, which is covered with opposed electrodes composed of a common electrode 209 and individual signal electrodes 210 facing each other through a gap 211 forming a heating portion 202. The heating layer 208 and the electrodes 209 and 210 underlying the electrode gap 211 are covered with and protected by a protecting layer 217. Incidentally, this protecting layer 217 ss omitted from FIG. 14.

In this head, the heating portion 202 abutting directly or through an ink ribbon against a recording medium such as heat-sensitive paper or recording paper is heated selectively in a dot shape by recording electric signals so that an image can be recorded on the recording medium.

Since the aforementioned electric signals are delivered through the signal electrodes 210, the density of the current flowing through the common electrode 209 increases, when the number of the heating portions to be selectively heated increases, so that the common electrode is broken by the electro-migration. In order to obviate this, the width of flat portion of the common electrode 209 has to be as large as about 0.5 to 2.0 mm with respect to that of the signal electrodes 210 of 50 to 200 μm.

In Europe and America, on the other hand, rough paper of smoothness of 5 to 10 sec having a coarse surface is preferred as the recording paper. This rough paper has to be forced into contact with the heating portions 202 by a strong pressure because the record (or print) is made very unclear by the ordinary recording method. As the means for applying the strong pressure, as indicated by a phantom line in FIG. 15, a recording paper 30 is preferably forced to contact at an inclination with the head. In the head of the prior art, however, the recording paper 30 cannot be inclined with respect to the head because it is obstructed by the wide common electrode 209 arranged at the side edge of the head. This arrangement of the wide common electrode 209 at the head side edge obstructs reduction of the size of the head, too, in another integrated circuit device.

Especially in the head, it is the recent trends tha the dot number is increased so as to improve the quality of the printed or recorded image and that the size of the substrate is reduced so as to drop the production cost. With the dot number increased, the common electrode has to be widened so as to obviate the electro-migration, and the substrate itself is enlarged. In order to meet the requirement that the recorded result is observed instantly after the recording, it is necessary to position the heating portions as close to the en face of the head as possible. This necessity is not substantially satisfied because the wide common electrode is arranged at the side edge of the substrate.

I , the Inventor, have found, as a result of our keen investigations, that the aforementioned problems are solved by forming the common electrode over the glazing layer, by sequentially laminating the insulating layer, the heating layer and the signal electrodes on the common electrode, while leaving a portion of the same, to form the heating portion, and by preventing the wide common electrode from occupying the side edge of the substrate. As a result of further investigations, I also have found, in the head thus constructed, that the temperature of the common electrode under the heating portions is raised to a high one if the dot density (i.e., the density of the heating portions) is further increased so as to obtain a recorded result of higher resolution, and is held at 200° to 300° C. even when no power is applied. When the common electrode becomes hot, the alkaline component such as Na contained in the glazing layer is ionized to diffuse through the common electrode into the heating layer to cause the aging of the resistance of the heating layer thereby to shorten the lifetime of the head. Incidentally, the head lifetime is assumed to terminate at the instant when the resistance changes ±15% with respect to a set value. In the structure thus far described, moreover, the material for the common electrode is a metal of high melting point because the insulating layer is formed at a high temperature. It is also found that the main component $SiO_2$ of the glazing layer and the material of the common electrode are subjected to a solid state reaction, when the common electrode becomes hot, to oxidize the common electrode and degrade the adhesiveness of the same.

SUMMARY OF THE INVENTION

The present invention has an object to solve the aforementioned problems accompanying the integrated circuit device of the prior art, to facilitate reduction of the size of the device, and to provide an integrated circuit device in which a recording medium is forced to contact with the head by a strong pressure so that even the rough paper can be excellently recorded.

The above-specified object of the present invention can be achieved by an integrated circuit device comprising signal electrodes, a common electrode and at least one of other circuit elements over a glazing layer, characterized: in that said common electrode has an extension extending over said glazing layer; and in that an insulating layer is formed between said extension and said signal electrodes and/or at least one of said circuit elements.

Another object of the present invention is to facilitate reduction of the integrated circuit device and to provide an integrated circuit device in which a recording medium is forced to contact with the head by a strong pressure so that even the rough paper can be excellently recorded and so that the device can exhibit excellent durability even for a high dot density.

The above-specified object of the present invention can be achieved by an integrated circuit device comprising signal electrodes, a common electrode and at least one of other circuit elements over a glazing layer, characterized: in that a diffusion preventing layer is formed close to said glazing layer between said glazing layer and another layer; in that said common electrode has an extension extending over said diffusion preventing layer; and in that an insulating layer is formed between said extension and said signal electrodes and/or at least one of said circuit elements.

BRIEF DESCRIPTION OF THE DRAWINGS

FIG. 1 is a top plan view showing a portion of a heat-sensitive recording head of serial type;

FIG. 2 is a top plan view showing the inside of the heat-sensitive recording head of FIG. 1;

FIG. 3 is a sectional view taken along III—III of FIG. 2;

FIG. 4 is an enlarged sectional view showing a portion of another heat-sensitive recording head of serial type;

FIG. 5 is an enlarged top plan view showing still another heat-sensitive recording head of serial type;

FIG. 6 is a perspective view showing a portion of a heat-sensitive recording head of line type;

FIG. 7 is a top plan view showing a portion of the heat-sensitive recording head of FIG. 6;

FIG. 8 is an enlarged section taken along line VIII—VIII of FIG. 7;

FIG. 9 is an enlarged section showing a portion of FIG. 8;

FIG. 10 is an enlarged sectional view showing a portion of another heat-sensitive recording head of line type;

FIG. 11 is an enlarged sectional view showing a portion of another embodiment corresponding to FIG. 3;

FIG. 12 is an enlarged sectional view showing another embodiment corresponding to FIG. 8; and FIG. 13 is an enlarged section showing a portion of FIG. 12.

FIG. 14 is a top plan view showing the inside of the heat-sensitive recording head of serial type; and FIG. 15 is an enlarged section taken along line XV—XV of FIG. 14.

DESCRIPTION OF THE PREFERRED EMBODIMENTS

In the present specification, the term "circuit element" indicates at least one unit element composing an electric circuit unit.

First of all, the mode of the present invention will be described in connection with the heating portion of the head and its neighborhood.

The head is majorly divided into two types—the serial type in which the recording is conducted by moving the head at a right angle with respect to the feeding direction of the recording paper, and the line type in which the recording is conducted with the head being fixed.

The first description is directed to the serial type.

This serial type is further divided into two sub-types - the longitudinal one-row printing type in which the heads are arrayed in one row, and the sequential column printing type in which the heads are arranged in the form of matrix. Since these two sub-types share the structure of the heating portions, however, the description to be made in the following relates to the longitudinal one-row printing type.

Figure 1:
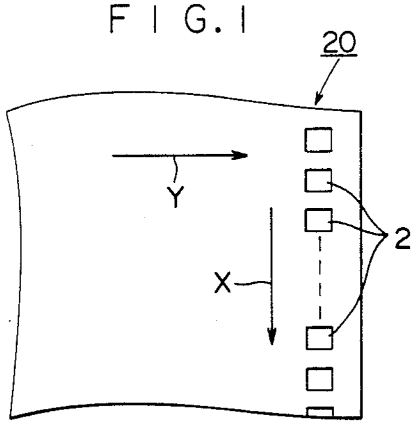
In FIGS. 1 to 13 showing embodiments of the present invention.

A head 20 is arranged, as shown in FIG. 1, such that usually twenty four heating portions 2 are arrayed in one row in parallel to the feeding direction X of recording paper (although not shown in the drawings) and such that the head 20 is adapted to conduct its printing operation while moving in a direction Y at a right angle with respect to the recording paper feeding direction X.

Figure 2:
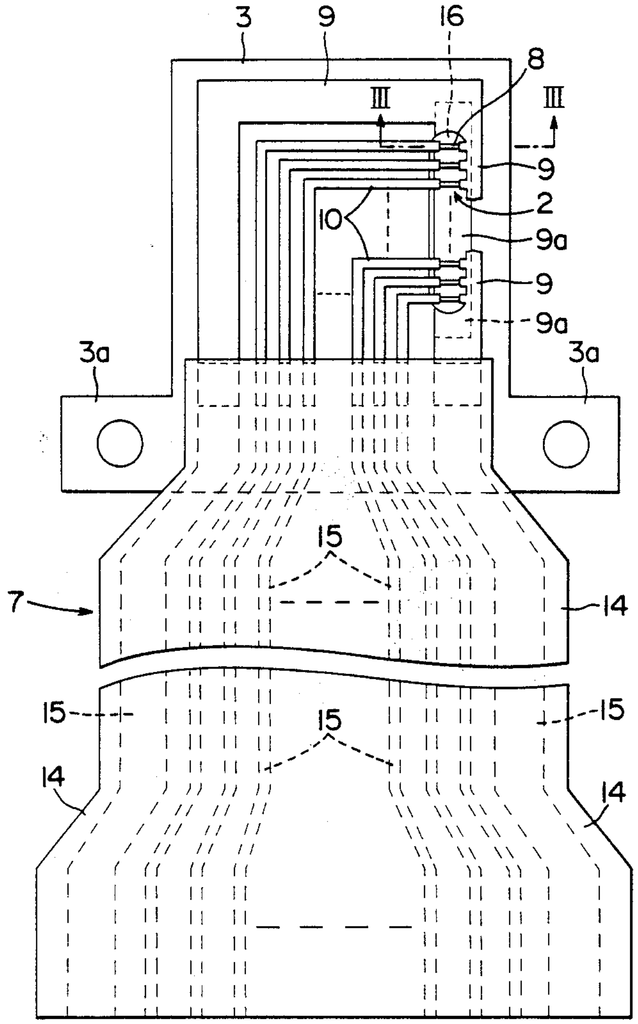

As shown in FIG. 2, usually twenty four heating layers (made of tantalum nitride, for example) 8 are arranged across a glazing layer 16 made of silicon oxide, for example, and formed in a straight form over an insulating substrate (made of a base of ceramics such as alumina) 3 and are constructed to have their one-side ends connected with a common electrode 9 of aluminum or gold, for example, and their other ends connected with signal electrodes 10 of aluminum or gold, for example, thereby to deliver the signals to the signal electrodes 10 for the heating portions 2.

The common electrode 9 and the signal electrodes 10 are thermally contact-bonded to leads 15 of copper foil in the vicinity of heat dissipating portions 3*a* formed at the end portions of the insulating substrate 3. The leads 15 are borne on a plastic bearing film 14 to form a flexible printed circuit 7 together with the bearing film 14. The leads 15 are plated at least on their end portions with solder, and the common electrode 9 and the signal electrodes 10 are plated at least on their end portions with nickel, in case they are made of aluminum, thereby to ensure the connections between the leads 15 and the common and signal electrodes 9 and 10.

The flexible printed circuit 7 is connected with the connector of a driving circuit unit, not shown in the drawings, to apply a d.c. bias to the heating portions 2 so that the movement of the head is facilitated by the connection of the flexible printed circuit 7.

Thus, the heating portions 2 conduct their heat generations selectively in response to the pulse signals coming from the signal electrodes 10 so that the head 20 prints while moving in the direction Y shown in FIG. 1.

Next, the line type will be described in the following.

Figure 6:
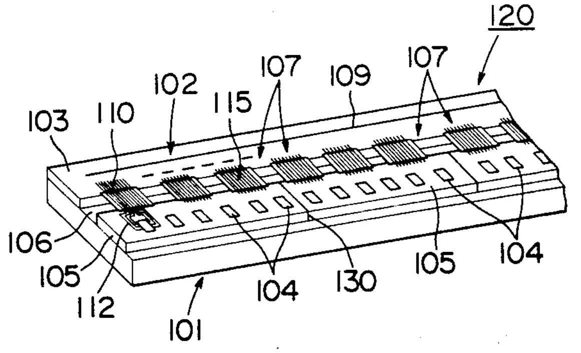

As exemplified in FIG. 6, a head 120 is constructed such that an insultting substrate 103 having a heating portion 102 and a print base 105 having a number of (or sixty four, for example) IC chips 104 are fixed over a common base 101 and opposed at a constant gap 106. The electrical connections between the IC chips 104 and the heating portion 102 are effected by a film carrier tape 107 which is extended over the aforementioned gap 106 and between the print base 105 and the insulating substrate 103.

Figure 7:
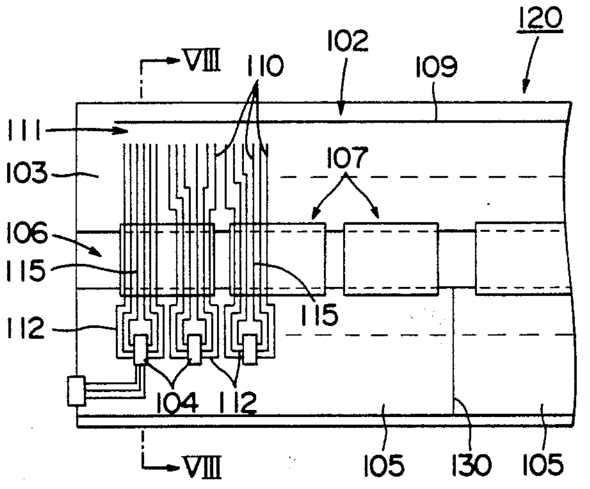

This connecting method will be described in detail with reference to both FIG. 7 and FIG. 8 providing an enlarged section taken along line VIII—VIII of FIG. 7.

Over the insulating substrate 103, there is formed a silicon oxide film (or a glazing layer) 116 acting as a foundation, over which is formed a heating layer 108. Over this heating layer 108, there are formed a common electrode 109 and a multiplicity of signal electrodes 110 which are arrayed in the longitudinal direction of the electrode 109 over the heating layer 108. Those two electrodes 109 and 110 form the heating portion 102 at their facing portions 111. On the other hand, the IC chips 104 are mounted in each predetermined number on each of the print bases 105, which are joined to each other through a separating line indicated at 130, and are bonded by wires 113 made of Au or Al to bonding pads 112 which are mounted in a predetermined pattern on the print bases 105. Incidentally, the aforementioned respective wiring patterns are simplified, as shown.

The film carrier tape 107 is prepared by adhering such a number (e.g., 64 which is reduced to 6, as shown) of leads 115 made of copper foil, for example, to a polyimide base 114, for example, as corresponds to that of the aforementioned signal electrodes 110 and wires 113. On the other hand, the insulating substrate 103 is further coated with a wear-resistance protecting film (or an insulating cover film) 117.

Incidentally, the materials of the individual components composing the head are not different from those of the aforementioned serial type.

The present invention will be specifically described in the following in connection with embodiments.

EMBODIMENT 1

This is the embodiment in which the present invention is applied to the serial type head.

Figure 3:
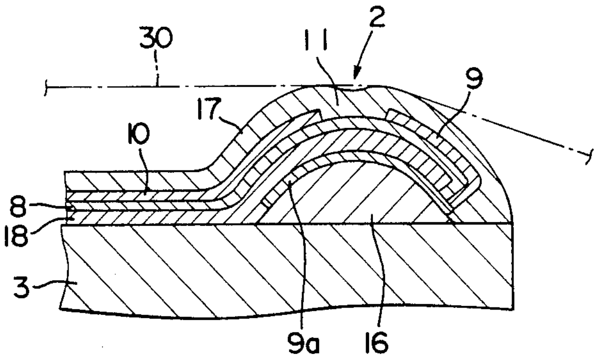

As shown in FIG. 3 providing an enlarged section taken along line III—III of FIG. 2, an extension 9*a* of the common electrode 9 is made of Mo, W or Ta having a thickness of 2 μm and is extended between the glazing layer 16 and a protecting layer 17, i.e., on the upper surface of the glazing layer 16 up to the skirt of the same. The heat of the heating portion 2 is prevented from dissipating into the insulating substrate 3 because the aforementioned extension 9*a* is made not to reach the upper surface of the insulating substrate 3.

The aforementioed extension 9*a* is covered with an insulating layer 18 of $SiO_2$ or $Si_3N_4$ having a thickness of 2 to 3 μm, which is further covered with the heating layer 8 of $Ta_2N$ having a thickness of 700 Å. This heating layer 8 is covered with the opposed common and signal electrodes 9 and 10 which are made of Au or Al having a thickness of 1 μm. The common electrode 9 is connected with the edge portion of its extension 9*a* to form an integral structure. The extension 9*a* of the common electrode 9 is set to have a width of 1.2 to 0.3 mm, which is slightly smaller than the width of 1.5 to 0.5 mm of the glazing layer 16. As a result, the extension 9*a* of the common electrode 9 and the signal electrodes 10 overlap one on the other at their end edge portions across the insulating layer 18 and the heating layer 8. Thanks to the construction of the head thus far described, the aforementioned extension 9*a* can be made wide enough for preventing the electro-migration.

The heating portion 2 and its neighborhood of the head are formed in the following manner.

The insulating substrate 3 of alumina is screen-printed with glass powder of $SiO_2$ and is then sintered at 700° to 800° C. to form the glazing layer 16 (which has a thickness of 30 to 100 μm).

Next, the extension 9*a* of the common electrode 9 is formed within a predetermined range over the glazing layer 16 by the sputtering, vapor deposition or photoetching method, as usual.

Next, the insulating layer 18 is formed like the aforementioned extension 9*a* over the extension 9*a* of the common electrode within a predetermined range and over the insulating substrate 3.

Next, the heating layer 8 is formed over the insulating layer 18 and the aforementioned extension 9*a* except their exposed edge portions by the sputtering, electron beam vapor deposition or the photoetching method.

Next, the common electrode 9 and the signal electrodes 10 are formed by the usual vapor deposition or photoetching method. The common electrode 9 is extended to merge into the exposed edge portion of the aforementioned extension 9*a* to form an integral structure.

Finally, those electrodes 9 and 10 are covered by the sputtering method with the protecting layer 17 of $Ta_2O_5$ or $Al_2O_3$ having a thickness of 5 μm.

The distance from the skirt of the glazing layer 16 to the head end portion is 200 μm (which was 1 to 2 mm in the head of the prior art).

Thus, the ink ribbon 30 can be inclined downward from the top of the heating portion 2, as indicated by a phantom line in the same Figure, so that the pressure of the ink ribbon 30 can be increased to ensure even the recording of the rough paper. Moreover, the size of the head can be made smaller by 10 to 20% than that of the head of the prior art.

Still moreover, the extension 9*a* of the common electrode is formed over the glazing layer 16 having the smooth surface so that its thickness can be made uniform. As a result, the insulating layer 18 overlying the extension 9*a* is freed from any defect such as the pin holes so that the extension 9*a* and the heating layer 8 is not short-circuited in the least and so that its sheet resistance can be made lower by about 40% than that of the head of the prior art. Since the common electrode 9 including its extension 9*a* is arranged over the glazing layer 16, furthermore, the heat of the heating portion 2 does not dissipate into the insulating substrate 3 through the common electrode 9 so that the thermal efficiency can be improved.

In the head of the prior art, on the other hand, the temperature of the heating portions arranged in the array has a trend of being lower at the two end sides and higher at the center of the head. In the head based upon the present invention, on the contrary, the aforementioned extension 9*a* having an excellent thermal conductivity is arranged over the glazing layer 16, as described above, so that the heating portion 2 can have a uniform temperature distribution to provide an excellent recorded result.

EMBODIMENT 2

Figure 4:
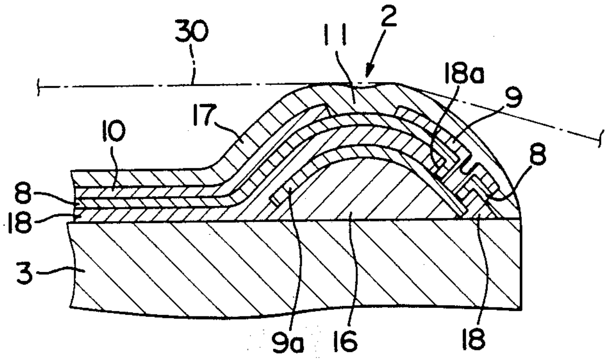

According to this embodiment, as shown in FIG. 4, the insulating layer 18 is formed near its end portion with a contact hole 18*a* extending to reach the extension 9*a* of the common electrode 9, and the contact hole 18*a* is masked at its central portion, when the heating layer 8 is formed, to expose the aforementioned extension 9*a* to that portion thereby to connect the common electrode 9 at the central portion of the contact hole 18*a*.

With the construction described above, the heating portion 2 has its neighborhood mechanically strengthened.

The remainder is similar to that of the foregoing embodiment 1.

MODIFIED EMBODIMENT

Figure 5:
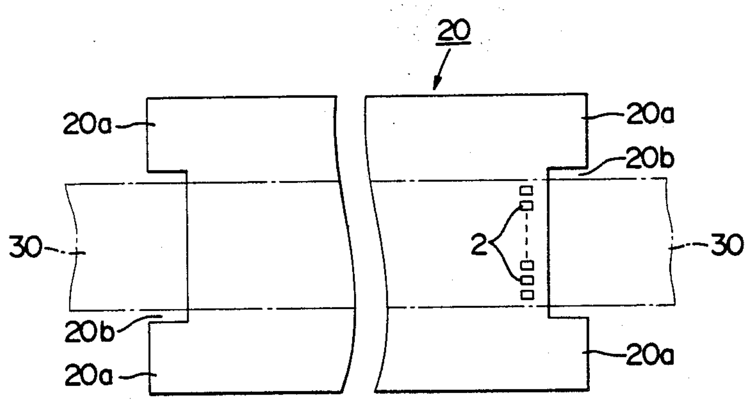

According to this Embodiment, as shown in FIG. 5, the head 20 is formed at both its end side edges with lands 20a, and the ink ribbon 3 indicated by phantom lines is fitted in a groove 20b defined by the lands 20a so that the lands 20a may be used as a guide for the ink ribbon 30. The common electrode 9 may adopt the construction of either of the foregoing Embodiments 1 and 2.

In the case of a high speed recording by the head of the serial type, the ink ribbon frequently comes out of engagement with the head to make the recording impossible. By forming the guide in the manner described above, however, there is no fear that the ink ribbon fails to engage with the head.

EMBODIMENT 3

In this Embodiment and a later described Embodiment 4, the present invention is applied to the head of the line type.

Figure 8:
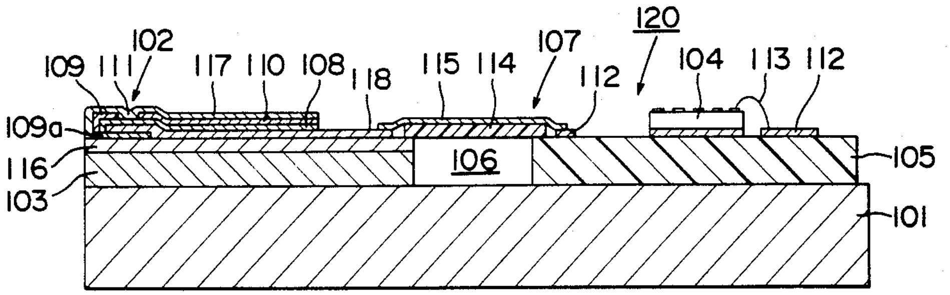
Figure 9:
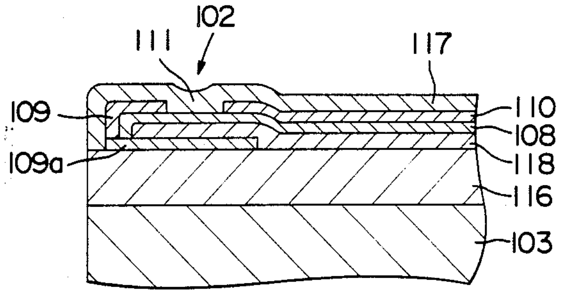

As shown in FIG. 9 providing an enlarged view of a portion of FIG. 8, the common electrode 109 has its extension 109a covering the glazing layer 116, which in turn is covered with an insulating layer 118 except the end portion of the aforementioned extension 109a, whereas the portion near the end portion of the aforementioned extension 109a and the insulating layer 118 are covered with the heating layer 108. Over the heating layer 108, there are opposed through the gap 111 the common electrode 109 and the signal electrodes 110 to form the heating portion 102. The common electrode 109 extends downward along the end face of the heating layer 108 until it merges into its extension 109a. The common electrode 109 and the signal electrodes 110 including the portion of the heating layer 108 below the inter-electrode gap 111 are covered with and protected by the wear-resistant protecting layer 117.

The remainder is similar to that of the foregoing Embodiment 1.

EMBODIMENT 4

Figure 10:
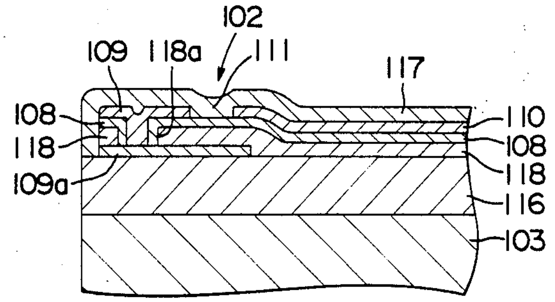

According to this Embodiment, like the foregoing Embodiment 2, the insulating layer 118 covers the whole area of the extension 109a of the common electrode 109 and is formed near its end portion with a contact hole 118a, through which the common electrode 109 extends to reach the aforementioned extension 109a, when the common electrode 109 is formed, to integrate the common electrode 109 and the aforementioned extension 109a, as shown in FIG. 10.

The remainder is similar to those of the foregoing Embodiments 2 and 3.

All the Embodiments thus far described are directed to the heat-sensitive recording head. In addition, the device can be small-sized by applying the present invention to another integrated circuit device, in which a common electrode and a multiplicity of signal electrodes are arranged in a multiplicity of circuit elements in a manner to face each other, such as an input circuit of a light-emitting diode array or a laser diode array.

EMBODIMENT 5

Figure 11:
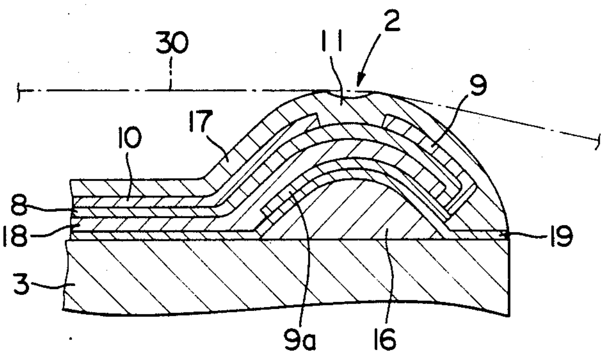
Figure 14:
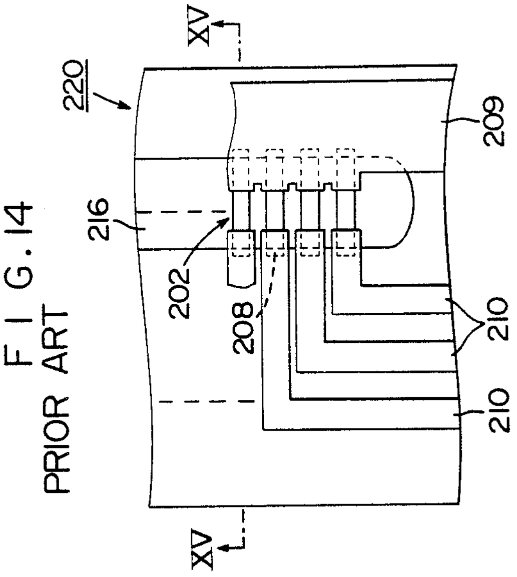
F I G. 14 PRIOR ART
In FIGS. 14 and 15 showing the example of the prior art.
Figure 15:
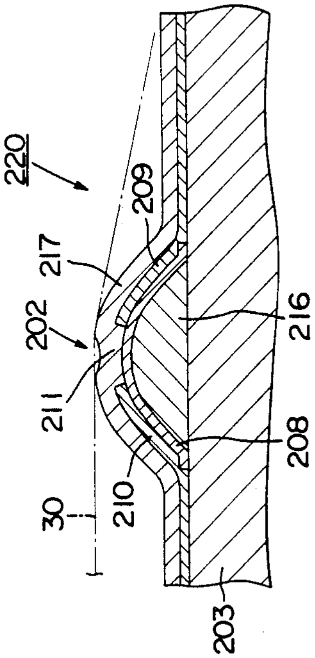
F I G. 15 PRIOR ART

As shown in FIG. 11 corresponding to FIG. 3, the glazing layer 16 and the insulating substrate 3 are covered with a layer 19 made of a nitride such as $Si_3N_4$ or BN having a thickness of 100 to 5,000 Å, which is covered with the extension 9a of the common electrode 9. This extension 9a is made of Mo, W or Ta having a thickness of 1 to 2 μm and is extended up to the skirt of the glazing layer 16. The heat of the heating portion 2 is prevented from dissipating into the insulating substrate 3 by forming the aforementioned extension 9a within a range over the glazing layer 16.

The aforementioned extension 9a is covered with the insulating layer 18 of $Si_3N_4$ or $SiO_2$ having a thickness of 0.5 to 5 μm, which is further covered with the heating layer 8 of $Ta_2N$ having a thickness of 500 to 1,500 Å. This heating layer 8 is covered with the opposed common and signal electrodes 9 and 10wwhich are made of Au or Al having a thickness of 1 to 2 μm. The common electrode 9 is connected with the edge portion of its extension 9a to form an integral structure. The extension 9a of the common electrode 9 is set to have a width of 1.2 to 0.3 mm, which is slightly smaller than the width of 1.5 to 0.5 mm of the glazing layer. As a result, the extension 9a of the common electrode 9 and the signal electrodes 10 overlap one on the other at their end edge portions across the insulating layer 18 and the heating layer 8. Thanks to the construction of the head thus far described, the aforementioned extension 9a can be made wide enough for preventing the electro-migration.

The aforemettioned layer 19 made of the nitride such as $Si_3N_4$ or BN functions as a diffusion preventing layer for preventing the alkaline component in the glazing layer 16 from diffusing into the aforementioned extension 9a of the common electrode 9 even if this extension is heated to a high temperature. As a result, the aforementioned alkaline component is prevented from invading into the heating layer 8 so that the stable resistance of the heating layer 8 can be warranted for a long period and so that the adhesiveness of the aforementioned extension 9a can be held stable for a long period.

The heating portion 2 and its neighborhood of the head are formed in the following manner.

The insulating substrate 3 of alumina is screenprinted with glass powder of $SiO_2$ and is then sintered at 700° to 800° C. to form the glazing layer 16 (which has a thickness of 30 to 100 μm).

Next, over the insulating substrate 3 including the glazing layer 16, there is formed by the sputtering method the nitride layer 19 acting as the aforementioned alkaline component diffusion preventing layer, which is subsequently covered by the sputtering method with the metal of high melting point such as Mo, W or Ta and patterned to form the extension 9a of the common electrode 9.

Next, the insulating layer 18 is formed like the aforementioned extension 9a over the extension 9a of within a predetermined range and over the insulating substrate 3.

Next, the heating layer 8 is formed over the insulating layer 18 and the aforementioned extension 9a except their exposed edge portions by the sputtering, electron beam vapor deposition or the patterning method.

Next, the common electrode 9 and the signal electrodes 10 are formed by the vapor deposition method or the sputtering and patterning method. The common electrode 9 is extended to merge into the exposed edge portion of the aforementioned extension 9a to form an integral structure.

All the aforementioned patterning treatments are conducted by the photoetching method.

Finally, those electrodes 9 and 10 are covered by the sputtering method with a protecting layer 17 of $Ta_2O_5$, $Al2_2O_3$ or SiN having a thickness of 5 to 10 μm.

Incidentally, if the nitride layer 19, the extension 9a of the common electrode 9 and the insulating layer 18 are laminated by the continuous sputtering method, this lamination is effective for preventing the contamination and improving the adhesiveness of the aforementioned extension 9a. In this case, the patterning treatment of the aforementioned extension 9a may be conducted by the masking method while it is being sputtered.

The distance from the skirt of the glazing layer 16 to the head end portion is 200 μm (which was 1 to 2 mm in the head of the prior art).

Thus, the ink ribbon 30 can be inclined downward from the top of the heating portion 2, as indicated by a phantom line in the same Figure, so that the pressure of the ink ribbon 30 can be increased to ensure even the recording of the rough paper. Moreover, the size of the head can be made smaller by 10 to 20% than that of the head of the prior art.

Still moreover, the extension 9a of the common electrode is formed over the glazing layer 16 having the smooth surface so that its thickness can be made uniform. As a result, the insulating layer 18 overlying the extension 9a is freed from any defect such as the pin holes so that the extension 9a and the heating layer 8 is not short-circuited in the least and so that its sheet resistance can be made lower by about 40% than that of the head of the prior art. Since the common electrode 9 including its extension 9a is arranged over the glazing layer 16, furthermore, the heat of the heating portion 2 does not dissipate into the insulating substrate 3 through the common electrode 9 so that the thermal efficiency can be improved.

In the head of the prior art, on the other hand, the temperature of the heating portions arranged in the array has a trend of being lower at the two end sides and higher at the center of the head. In the head based upon the present invention, on the contrary, the aforementioned extension 9a having an excellent thermal conductivity is arranged over the glazing layer 16, as described above, so that the heating portion 2 can have a uniform temperature distribution to provide an excellent recorded result.

Thanks to the formation of the nitride layer (or the diffusion preventing layer) 19 over the glazing layer 16, moreover, the alkaline component in the glazing layer 16 is prevented from diffusing into the overlying layers so that the function of the head can be prevented from aging due to both changes in the resistance of the heating layer 8 and deterioration of the adhesiveness of the extension 9a of the common electrode 9, even if the dot density is increased, to provide a excellently durable and highly reliable head.

EMBODIMENT 6

This is an emobidment in which the present invention is applied to the head of the line type.

Figure 12:
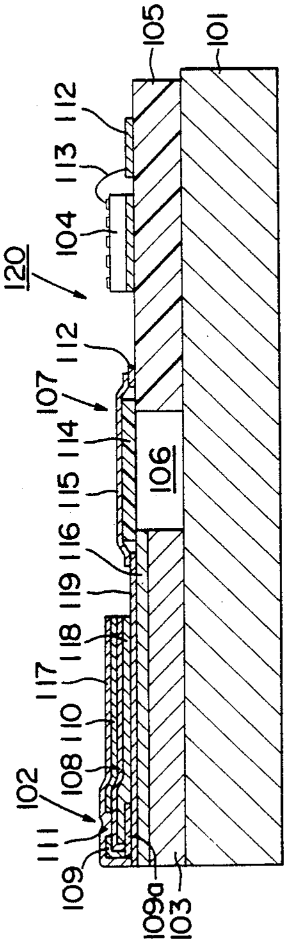
Figure 13:
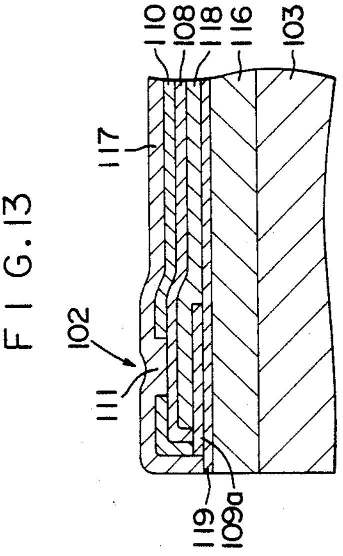

As shown in FIG. 13 providing an enlarged section showing a portion of FIG. 12, the glazing layer 116 is covered with a nitride layer 119 which is similar to the nitride layer (or the diffusion preventing layer) 19 (which should be referred to FIG. 11) of the foregoing Embodiment 5. The common electrode 109 has its extension 109a covering the nitride layer 119, which in turn is covered with the insulating layer 118 except the end portion of the aforementioned extension 109a, whereas the portion near the end portion of the aforementioned extension 109a and the insulating layer 118 are covered with the heating layer 108. Over the heating layer 108, there are opposed through the gap 111 the common electrode 109 and the signal electrodes 110 to form the heating portion 102. The common electrode 109 extends downward along the end face of the heating layer 108 until it merges into its extension 109a. The common electrode 109 and the signal electrodes 110 including the portion of the heating layer 108 below the inter-electrode gap 111 are covered with and protected by the wear-resistant protecting layer 117.

The remainder is similar to that of the foregoing Embodiment 5.

As has been described hereinbefore, the integrated circuit device based on the present invention is constructed such that the common electrode has its extension extending over the glazing layer and such that the insulating layer is formed between the extension, the signal electrode and/or at least one of the circuit elements. As a result, the common electrode does not occupy a wide space on the flat surface of the integrated circuit device so that the integrated circuit device can be small-sized In case the present invention is applied to the heat-sensitive recording head, for example, moreover, the heating portion can be positioned remarkably close to the end portion of the device, and the recording medium can be forced to contact by the strong pressure resulting from the inclined contact thereof so that a recorded result in high image quality can be attained even on the rough paper having a rough surface. Since the extension of the common electrode is arranged through the insulating layer over the glazing layer having the smooth surface, moreover, the recorded result can have an excellent quality as a result of the dropped sheet resistance, the reduced heat dissipation, the improved thermal efficiency and the uniform temperature distribution of the heating portions.

Still moreover, the integrated circuit device based on the present invention is constructed such that the diffusion preventing layer covers the vicinity of the glazing layer and the area between this glazing layer and another layer, such that the common electrode has its extension extending over the diffusion preventing layer, and such that the insulating layer is formed between that extension, the signal electrodes and/or at least one of the circuit elements. As a result, the following effects can be attained.

Specifically, the common electrode does not occupy a wide space on the flat surface of the integrated circuit device so that the integrated circuit device can be small-sized.

In case the present invention is applied to the heat-sensitive recording head, for example, moreover, the heating portion can be positioned remarkably close to the end portion of the device, and the recording medium can be forced to contact by the strong pressure resulting from the inclined contact thereof so that a recorded result in high image quality can be attained even on the rough paper having a rough surface. Since the extension of the common electrode is arranged through the insulating layer over the glazing layer having the smooth surface, moreover, the recorded result can have an excellent quality as a result of the dropped sheet resistance, the reduced heat dissipation, the improved thermal efficiency and the uniform temperature distribution of the heating portions. Especially in case the integrated circuit device based on the present invention is applied to the head, for example, this head can be prevented from aging, i.e., from having its heating layer changing in the resistance, even if the dot density is increased, so that is can enjoy a sufficient durability.

What is claimed is:

1. A integrated circuit device comprising signal electrodes, a common electrode, and a heating layer over a glazing layer, wherein said common electrode has an extension extending directly over said glazing layer, and an insulating layer is formed between said extension and said signal electrodes and/or said heating layer.

2. The integrated circuit device of claim 1 further comprising a diffusion preventing layer between said glazing layer and said extension.

3. An integrated circuit device according to claim 1 wherein said extension is made of a material selected from the group consisting essentially of Mo, W and Ta.

4. An integrated circuit device according to claim 1, wherein said insulating layer is made of a material selected from the group consisting essentially of $SiO_2$ and $Si_3N_4$.

5. An integrated circuit device according to claim 1, further comprising a heating layer formed over said insulating layer.

6. An integrated circuit device according to claim 1, wherein said insulating layer has a contact hole for connecting said common electrode with said extension.

* * * * *